(No Model.) 6 Sheets—Sheet 3.

P. MALTBY.
REVERSING VALVE FOR LOCOMOTIVES.

No. 347,881. Patented Aug. 24, 1886.

Witnesses
H. W. Elmore
Fred V. Fischer

Inventor
Philo Maltby.
By his Attorney
J. R. Nottingham (No Model.) 6 Sheets—Sheet 4.
P. MALTBY.
REVERSING VALVE FOR LOCOMOTIVES.
No. 347,881. Patented Aug. 24, 1886.

Witnesses
H. W. Elmore,
Fred V. Fischer,

Inventor
Philo Maltby.
By his Attorney
J. R. Nottingham

N. PETERS, Photo-Lithographer, Washington, D. C.

(No Model.) 6 Sheets—Sheet 5.
P. MALTBY.
REVERSING VALVE FOR LOCOMOTIVES.
No. 347,881. Patented Aug. 24, 1886.
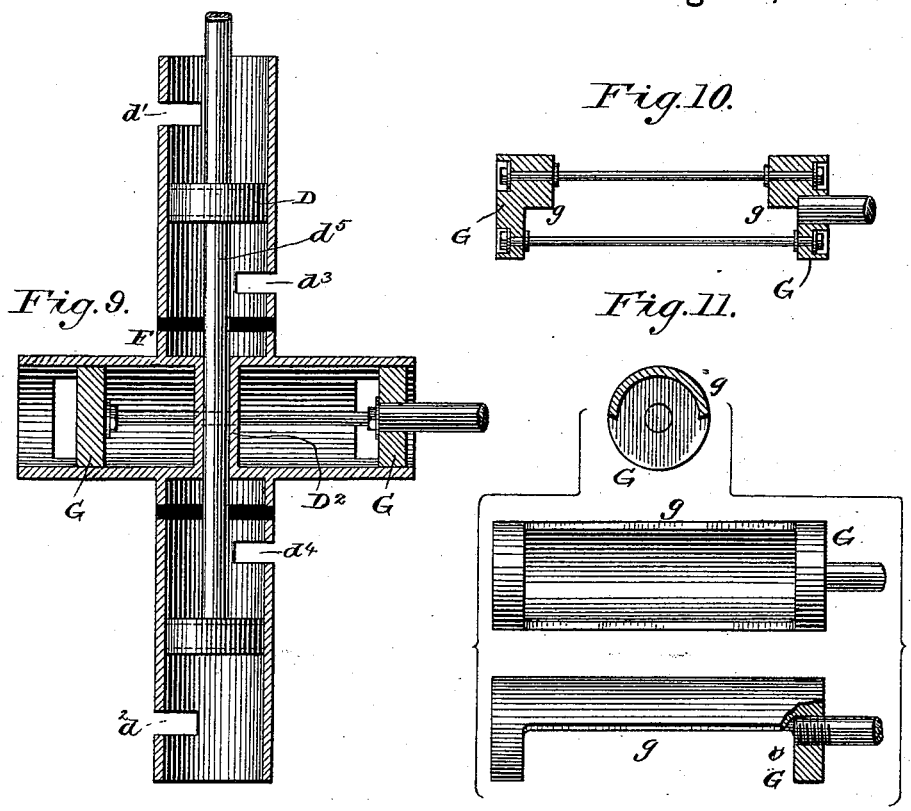
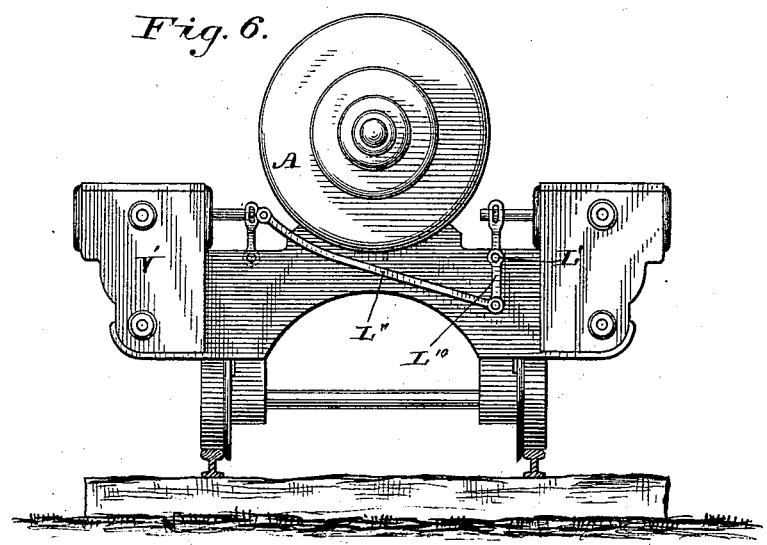
Witnesses
H. W. Elmore
Fred V. Fischer
Inventor
Philo Maltby.
By his Attorney
J. R. Nottingham
N. PETERS, Photo-Lithographer, Washington, D. C.

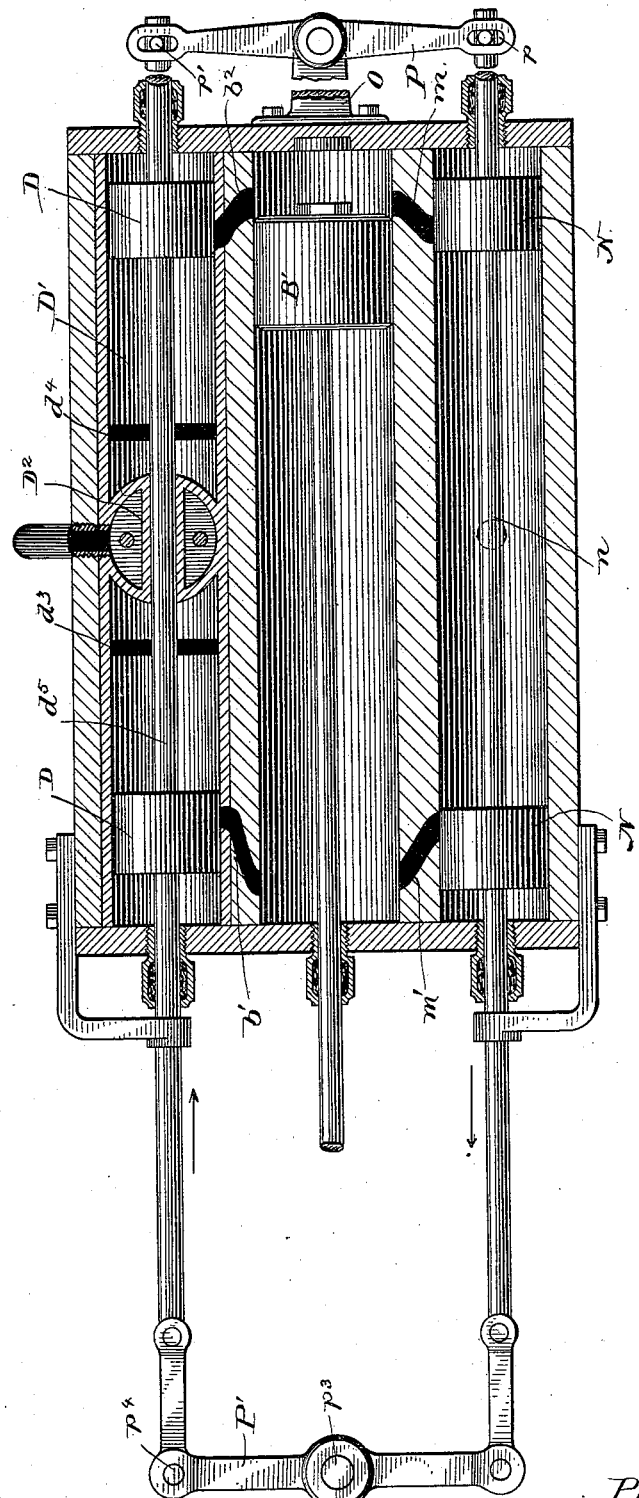

UNITED STATES PATENT OFFICE.

PHILO MALTBY, OF CLEVELAND, OHIO, ASSIGNOR OF ONE-HALF TO L. G. HINE, OF WASHINGTON, DISTRICT OF COLUMBIA.

REVERSING-VALVE FOR LOCOMOTIVES.

SPECIFICATION forming part of Letters Patent No. 347,881, dated August 24, 1886.

Application filed April 29, 1886. Serial No. 200,587. (No model.)

*To all whom it may concern:*

Be it known that I, PHILO MALTBY, a citizen of the United States, residing at Cleveland, in the county of Cuyahoga and State of Ohio, have invented certain new and useful Improvements in Reversing-Valves for Locomotives; and I do hereby declare the following to be a full, clear, and exact description of the invention, such as will enable others skilled in the art to which it appertains to make and use the same.

This invention relates to valve-shifting mechanism for steam-engines; and the novelty consists in the construction, arrangement, and adaptation of parts, as will be more fully hereinafter set forth, and specifically pointed out in the claims.

I have illustrated and will describe the invention as applied to locomotives, for the reason that its advantages in that relation seem to be more apparent; but it will be obvious to those skilled in the art that the important features of the invention will apply with equal success to marine or upright engines, and in other relations and combinations.

In locomotives as ordinarily in use it is necessary to employ four eccentrics, and unwieldy and complicated mechanism is employed to connect the shifting and reversing valves with the eccentrics and with the cab. I greatly simplify these connections and employ but two eccentrics.

The invention is illustrated in the accompanying drawings, which form a part of this specification, and in which—

Figure 1:
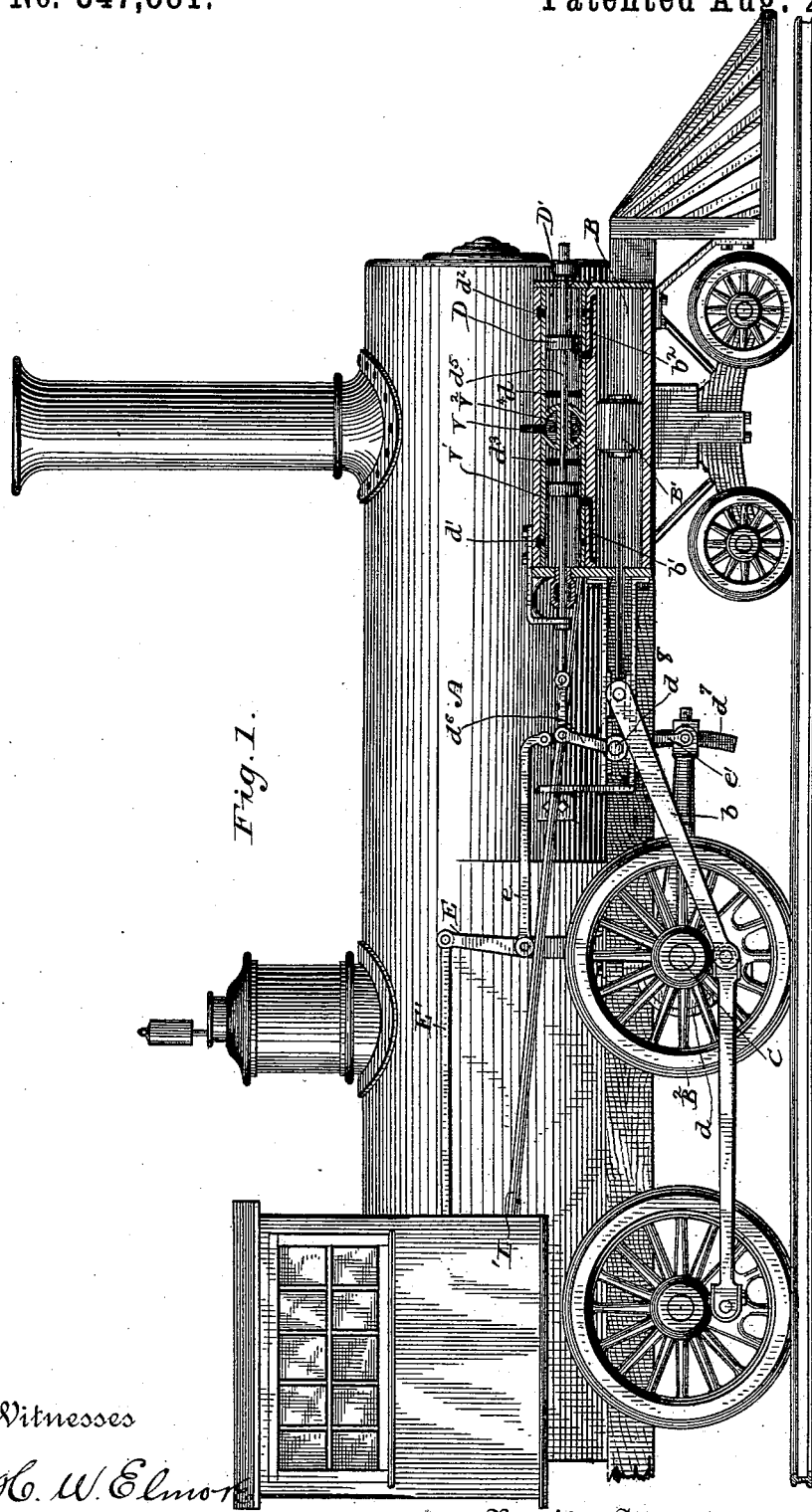
Figure 2:
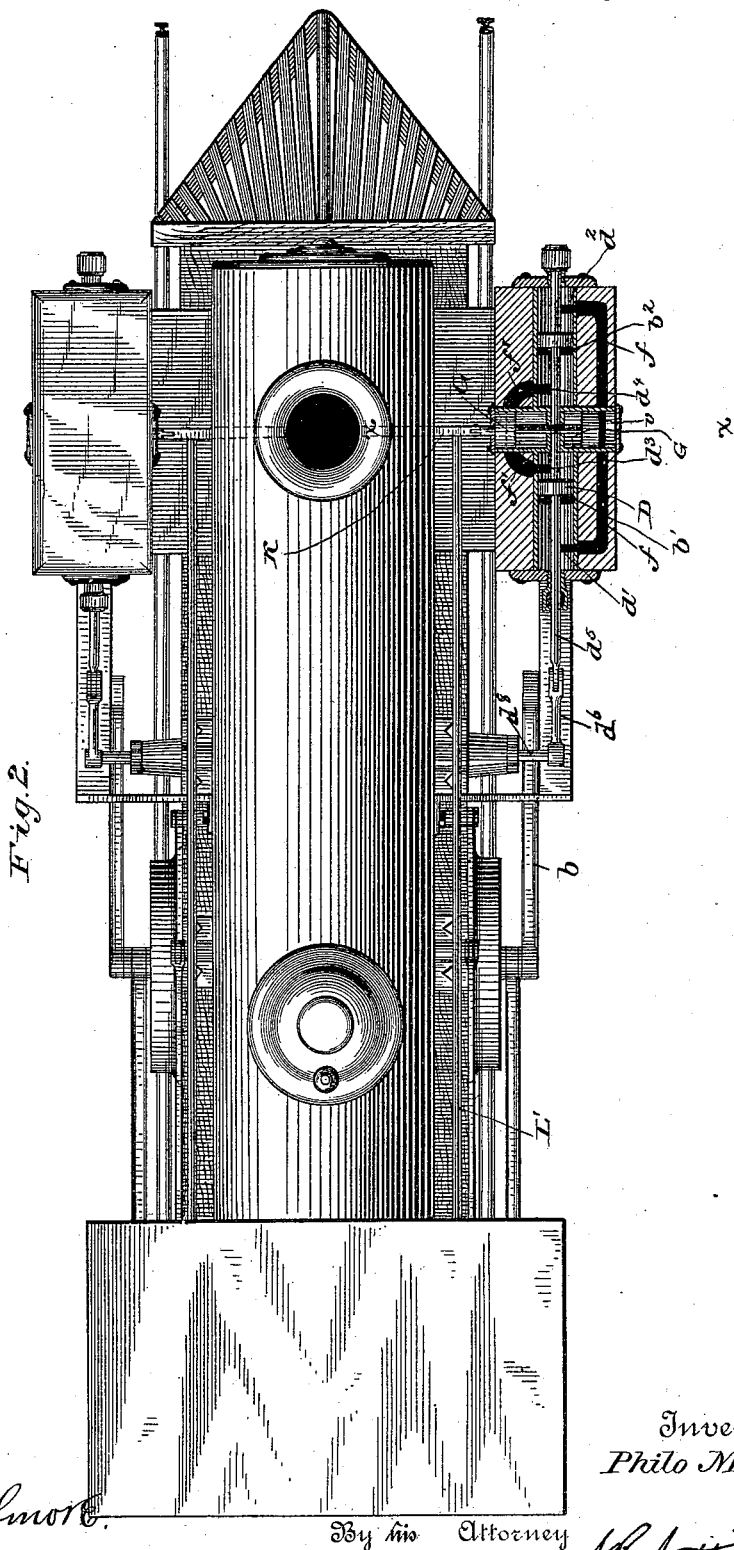
Figure 3:
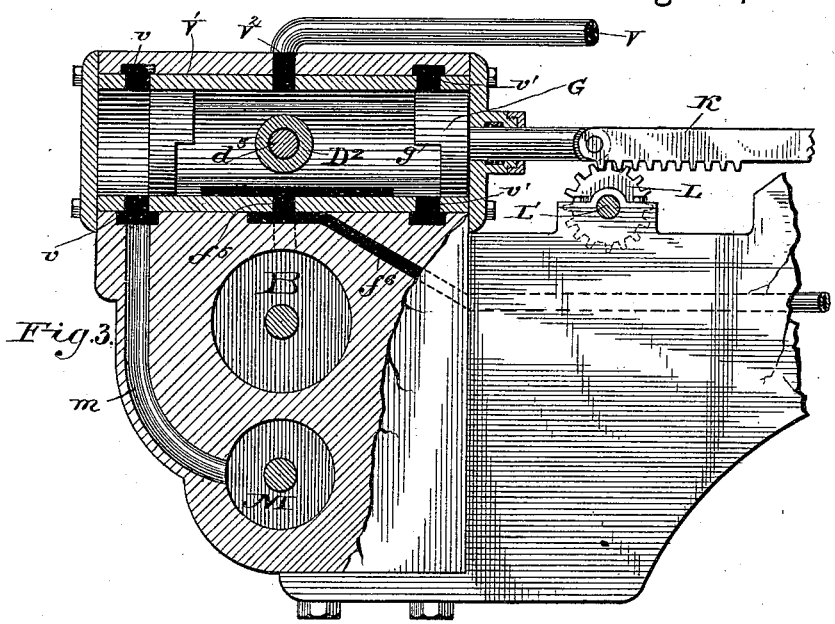
Figure 4:
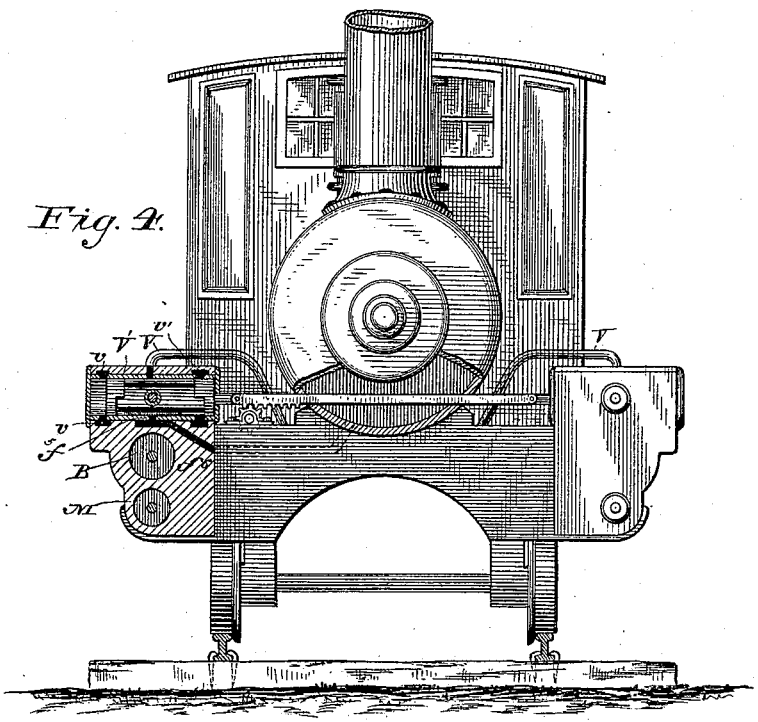
Figure 5:
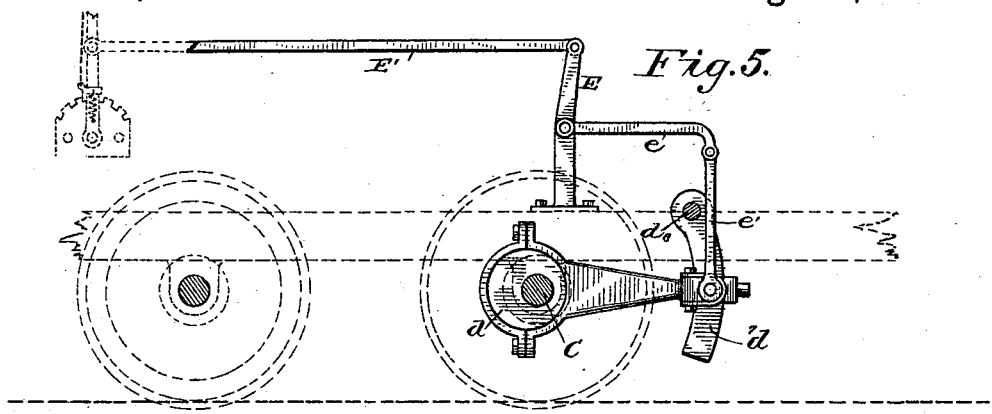
Figure 7:
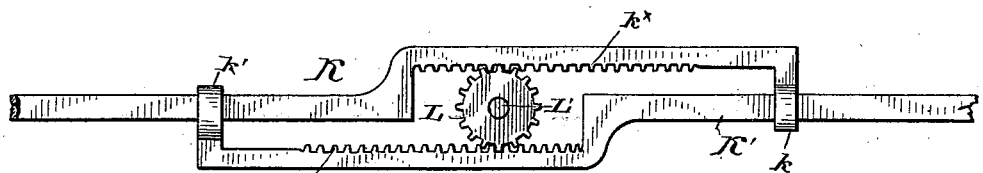
Figure 8:
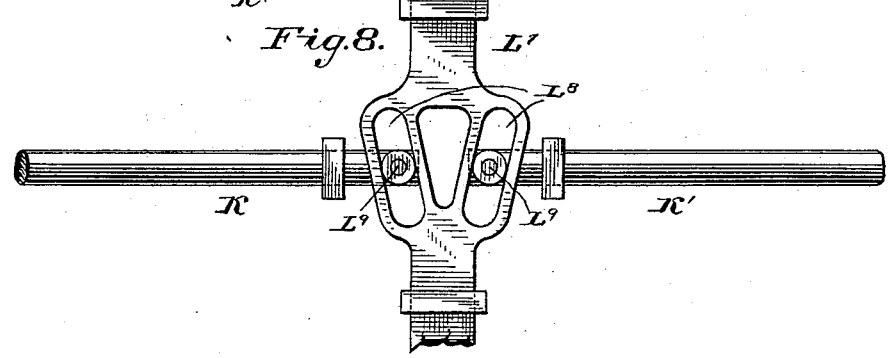
Figure 12:
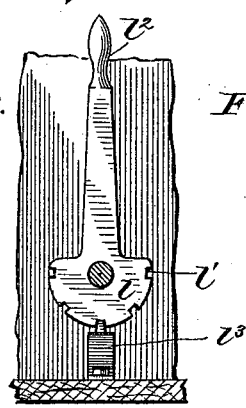
Figure 13:
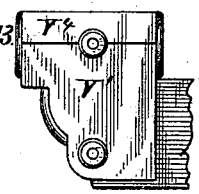

Figure 1 is a side elevation of a locomotive, with parts in section to show internal construction of cylinder, valve-chests, ports, valves, and valve-shifting connection. Fig. 2 is a top plan view with ports in horizontal section, the section being taken along the longitudinal center of the valve-chest. Fig. 3 is a transverse section, taken on a larger scale, along the line $x\,x$ of Fig. 2. Fig. 4 is a front elevation, parts being in section upon the same line as Fig. 3, and showing the live-steam connections. Fig. 5 is a detail showing an eccentric, a sword-arm, and connections for changing the lead from the cab. Fig. 6 is a transverse elevation showing connections for shifting two reversing-valves in opposite directions simultaneously, the valves and ports being arranged reversely on opposite sides of the engine. Fig. 7 is a detail in elevation, showing a modified construction of mechanism for this purpose, the pinion being operated by a rock-shaft. Fig. 8 is a similar view of another modification, a slotted frame being arranged to operate with an endwise thrust for a similar purpose. Fig. 9 is a horizontal central section of the valve-chests, showing also the shifting and reversing valves. Fig. 10 is a detail section showing the construction of the reversing-valve. Fig. 11 is in three parts and shows a modified form of the reversing-valve in different positions. Fig. 12 is a detail of the operating-lever and its quadrant. Fig. 13 is an end view of one of the steam-chests, showing it constructed in two parts. Fig. 14 is a vertical longitudinal section of the upper and lower valves and steam-chest.

The invention is designed to be readily applied to locomotives now in use. I will first describe it in its simplest form. In some instances the construction of a locomotive will be such that there will not be room to apply a valve-chest below the cylinder. Where such auxiliary valve can be employed I prefer that construction.

Referring to the drawings, the letter A designates the boiler; B, the cylinders; B', the piston connected by pitman $b$ to the driver $B^2$ on the driving-shaft C. D designates the valve, which controls the inlet of steam to the cylinder, and $d$ is its actuating-eccentric. These parts are of any approved construction.

Live steam is taken from the boiler and through the pipe-connection V. It is led into the top of the casing V' and into a chamber, $V^2$, therein. This chamber $V^2$ connects by a port, $v$, through the outer end of the reversing-valve chest F with a steam-passage, $f$, and by a port, $v'$, through the inner end of the chest F with a steam-passage, $f'$. The passage $f$ connects with the valve-chest D' by a port, $d'$, near one end, and by a port, $d^2$, near the opposite end. The passage $f'$ is located upon the opposite side of the valve-chest, and connects with said chest by two ports, which open into the same upon each side of and adjacent to its longitudinal center, the port $d^3$ being upon the same side as the port $d'$ of the passage $f$, and the port $d^4$ corresponding with the port $d^2$ thereof. Between the vertical planes of the ports $d'$ $d^3$ in the bottom of the valve-chest D' is a port, $b'$, which connects with the rear end of a cylinder, B, and between the ports $d^2$ and $d^4$ is a bottom port, $b^2$, which connects the valve-chest D' with the front end of said cylinder.

The reversing-valve chest F and the inner sections of the valve-chest D' are made in a single casting. This is important, as allowing the end sections of the valve-chest D', those portions which are subject to the constant wear of the valve-plugs D, to be removed and renewed with little trouble or derangement. This central casting has a tube, $D^2$, through which the valve-stem $d^5$ loosely operates. The diameter of this tube is so much less than that of the chest D' as to allow exhaust-steam to pass freely in either direction toward the center of the chest F and escape through the port $f^5$, and thence through channel $f^6$ to the smoke-stack or elsewhere.

The plugs of the valve D are so arranged as to cover both ports $b'$ $b^2$ at the same time and to move simultaneously, being rigid on the stem $d^5$.

The ports $v$ $v'$ extend entirely through the chest F and connect below with the steam-passages $f$ $f'$, respectively. The reversing-valves G are provided with laps $g$, which serve to close the upper passages of the ports $v$ $v'$, and are cut away upon the lower side to allow that portion of either port to be uncovered, according to the position of the valve. As shown in Fig. 11, these laps $g$ may comprise a continuous connecting-plate.

The direction of the steam, and hence the operation of the parts thus far described, is obvious. The reversing-valve being thrown into the position shown in Figs. 3 and 4, the port $v'$ is covered, and the port $v$ allows the live steam to pass into the passage $f$, from which passage it enters the valve-chest D' through the ports $d'$ $d^2$. The position of the valve D is such (see Fig. 2) that only the passage $b'$ is uncovered, and hence live steam passes to the cylinder B through that passage. Meanwhile as the piston advances to the front of the cylinder, the exhaust is carried on through the port $b^2$, and through the ports $d^3$ $d^4$ into the passage $f'$, up through the lower portion of the port $v'$ into the chest F, and thence escapes through the exhaust-passages $f^5$ $f^6$. (See Figs. 3 and 4.) With the reversing-valve G in the opposite position, the live steam will pass through $f'$ $d^3$ $d^4$ $b^2$, and the exhaust be carried on through the ports $b'$ $d'$ $d^2$, passages $f$, and port $f^5$. The steam-passages $f$ are upon the outer side, and hence in the locomotive it is necessary to use a two-part connection between the two reversing-valves, as these valves must move simultaneously in opposite directions. I provide a novel arrangement for this purpose. A rack-rod, K, is connected with one reversing-valve upon one side of a locomotive, and a similar rack-rod, K', is connected with the reversing-valve upon the other side. The rod K has a loop, $k$, which engages the shank of the rod K', and the rod K' has a loop or stirrup, $k'$, which engages the shank of the rod K. This means of engagement insures that the two rack-rods will retain their positions relatively to each other and with a pinion, L, which is constantly engaged with the teeth $k$ of each rod K K'. The pinion L is rigid upon a rock-shaft, L', which extends within the cab, and is there provided with a rigid lever, $L^2$, by means of which the valves are simultaneously operated in opposite directions. The lever $L^2$ has a quadrant, $l$, provided with notches $l'$, agreeing with the different desired positions of the reversing-valve, and a spring-catch, $l^2$, connected with a foot-lever serves to lock the parts in a well-known manner.

In Fig. 8 I show a modification in which a thrust-rod, $L^7$, is provided with angular slots $L^8$, which engage pins $L^9$ upon the valve-rods K K', to move them simultaneously in opposite directions. With this construction the rod $L^7$ is pushed bodily forward and withdrawn by any suitable connection. The valve D is operated arbitrarily by the eccentric connections. By means of the reversing-valves and their connections, as described, the engineer can readily and easily direct the live steam to the chest D', between the plugs of the valve D, through the passage $f'$, or outside the plugs of said valve through the passage $f$. If the live steam is directed by the latter passage $f$, the exhaust is carried on through the passage $f'$ and exhaust $f^5$ of the chest F, and vice versa. The valve construction is compact. The reversing-valve chest serves as a passage for both live and dead steam.

In Fig. 6 I show another modification, in which the shaft L' is rigidly connected with a bar, $L^{10}$. The upper end of this lever $L^{10}$ is connected loosely to one of the reversing-valves, while the opposite end thereof is, by a link, $L^{11}$, connected loosely with the other reversing-valve. I consider these devices for manipulating the reversing-valves of a locomotive to be mechanical equivalents. The eccentric $d$ is adjustably connected upon either side with a sword-arm, $d^7$. This sword-arm is rigid with a rock-shaft, $d^8$, and an arm, $d^6$, rigid with the shaft $d^8$, connects with the valve-stem $d^5$. A pivoted lever, E, having a rigid arm, $e$, is at the upper end loosely connected with a thrust-rod, E', which passes back into the cab, and a link, $e'$, connects the arm $e$ with the free end of the eccentric connection. This arrangement of cut-off is designed to allow the throw of the valve D to be changed at will. In some instances I may use two shifting-valves instead of one, and when there is room sufficient below the cylinder I prefer such construction. In such case I omit the steam-passages $f$ and ports $d'$ $d^2$ above, and connect the port $v$ directly with the auxiliary valve-chest M below the cylinder, as shown in Fig. 14. I consider this an equivalent of the construction shown in Figs. 1, 2, &c.

Referring to Fig. 3, $m$ designates a steam-pipe, which connects the port $v$ of the reversing-valve chest with the central part of the valve-chest M. A plug-valve, N, operates in this chest M, and its stem $n$ is connected to the stem $d^5$ of the valve D. The stems $d^5$ $n$ pass through suitable stuffing-boxes in their respective valve-chests. As shown, I employ a bracket, O, on the front end of the cylinder B, and in this bracket I pivot a walking-beam, P, provided near each end with a slot, $p$, which receives loosely a pin, $p'$, upon each of the stems $n$ $d^5$. Pivoted at $p^3$ to any convenient part of the frame of the engine is another walking-beam, P', which at either end is pivoted, as at $p^4$, with each of the stems $d^5$ $n$. One of the valves—preferably the valve D—is operated directly by the eccentric, and the other valve, N, is forced, by the connections P P', &c., to move simultaneously with the valve D, but in the opposite direction. In the latter construction of valve the proportions are slightly modified, the ports $b'$ $b^2$, which connect the valve-chest D' with the cylinder, being arranged nearer the ends of the chest. The chest M has ports $m'$ $m^2$, which connect the chest with the lower side of the cylinder, as shown.

Fig. 14 shows the arrangement of the parts upon one side of the locomotive, that side upon which the crank is on the dead-center. The plugs of the valves D N lie directly over their respective ports $b'$ $b^2$ and $m'$ $m^2$. As soon as the engine is started, the valve D moves to the right, as indicated by the arrow, and the live steam, which has approached through the passages $f'$ $d^3$ $d^4$, passes through the port $b^2$ to the front end of the cylinder, and simultaneously therewith the valve N has moved toward the left and opened the port $m'$ for the exhaust to pass through the pipe $m$, lower part of the port $v$, and port $f^5$ to the smoke-stack. Of course when the reversing-valve G is in the position shown in Fig. 3, the live steam will pass through the passages $v$ and $m$ to the lower chest, M, and the exhaust will be carried on through the chest D' and passages $f'$, $v'$, and $f^5$. The construction of the valve-chest has some importance. It is made in two parts, one part, V$^4$, of which is removable, being secured in place by the proper bolts. The cap V$^4$ has proper cavities to receive the upper halves of the chests F D', and in it is formed the live-steam chamber V$^2$.

It will be observed that with my construction I only use two eccentrics, instead of four. I do away entirely with the ordinary link-connection and use a less number of joints. In locomotives this latter is important, as to keep a large number of joints tight has been a thing of difficult accomplishment.

My device is worked easily, and can be manipulated with entire accuracy.

In employing the single valve the exhaust-steam has ample time to escape while being fed at the other end, as it has to be forced through an escape-port of less than one-fourth the size of the port at the nozzle. In a single valve, as I have described, it is not possible to give any lead to the exhaust. I obviate this difficulty, however, by making larger ports.

It will be understood that the ports may be so arranged that results similar to those described will follow, mounting both reversing-valves upon a single stem, (see Fig. 4,) but in such case the ports will not be arranged reversely upon opposite sides, but the passages $f'$ will be upon the same side of both chests D'. This feature has especial importance in allowing a battery of several engines to have their several reversing-valves so connected that all the engines of the series may be operated from a single rock-shaft. I thus avoid the multiplicity of links which are used, as at present practiced, in ganging several engines side by side, as in marine propulsion.

Having thus fully described my invention, what I desire to secure by Letters Patent, is—

1. In a locomotive, the combination, with the side valves controlling the steam-ports of two cylinders, of reversing-valves connected together on an axial line and arranged to control the flow of steam, a single rock-shaft, and connections for moving both reversing-valves simultaneously from the cab, as set forth.

2. In a locomotive, the combination, with two cylinders, a slide-valve for each, and two eccentrics controlling the said valves, of two reversing-valves connected together on an axial line and arranged one adjacent to each slide-valve, and a single rock-shaft, and connections leading from the cab and arranged to move the reversing-valves simultaneously in opposite directions, as herein specified.

3. The combination, with valve-chest D' and cylinder having connecting steam-ports $b'$ $b^2$, and with a valve having plugs arranged to cover both ports simultaneously, of a reversing-valve chest arranged on the same plane and intersecting at the center with the chest D', and having steam-ports $v$ $v$ and exhaust-port $f^3$, a reversing-valve, as G, and passages leading one set to the valve-chest outside the plugs and one set to the said chest between the plugs, and means for shifting the reversing-valve at will, whereby, when the live steam is fed through either set of passages, the exhaust is carried on through the other set, and in either case the exhaust is made through the center of the reversing-valve chest, as set forth.

4. In an engine substantially as described, the valve-chest D' and reversing-valve chest F, arranged upon the same plane, each intersecting the other at the center, and having a central exhaust-port, as $f^5$, at the bottom of the intersecting portion, as set forth.

5. In an engine as described, the chests D' F, arranged upon the same plane and intersecting at the center with the chest D', and formed in a single casting and having a tubular bearing, as $D^2$, combined with the valves D G and stem $d^5$, as and for the purposes specified.

6. The combination, with the two cylinders and their valve-chests D', the ports $b'$ $b^2$, the steam-passages $f$ $f$, and connecting-ports $d'$ $d^2$ and $d^3$ $d^4$, arranged reversely on opposite sides of the engine, of the reversing-valves G, controlling the passages $f$ $f'$, rack-rods extending inwardly from each valve, and a rock-shaft and pinion operated from the cab and arranged to move the reversing-valves simultaneously in opposite directions, as set forth.

7. In a locomotive, the combination, with a cylinder, B, of two valve-chests arranged one above and one below said cylinder, a steam-passage, as $m$, connecting the lower chest with a source of steam, steam-connecting ports between said chests and cylinder, two shifting valves, one in each chest, yoked together, so as to move simultaneously in opposite directions, a single eccentric connected to one of each pair of said valves, and steam-connections whereby when live steam is admitted to either chest the exhaust will be carried on through the other chest, as set forth.

8. In a locomotive-engine, substantially as described, the combination, with the reversing-valves G, having toothed stems K K', extending inwardly and yoked together, of a rock-shaft, L', extending into the cab and carrying a pinion which meshes with both valve-stems, a lever arranged on the rock-shaft within the cab, and a pedal-quadrant arranged to lock the shaft in either of the desired positions of the reversing-valves, as set forth.

9. In a locomotive as described, the combination, with the chests D' F, the passages $f$ $f'$, and ports $v$ $v'$, arranged as shown, of the reversing-valves G, having lips $g$ upon the upper portions of each plug, whereby the upper portions of either port $v$ $v'$ will be closed to the passage of live steam, while the lower portion of said port will be open to the exhaust, as specified.

In testimony whereof I affix my signature in presence of two witnesses.

PHILO MALTBY.

Witnesses:
  J. R. NOTTINGHAM,
  WILLIAM FITCH.